(12) United States Patent
Ferrell

(10) Patent No.: US 11,908,247 B2
(45) Date of Patent: Feb. 20, 2024

(54) SYSTEMS AND METHODS FOR COLLECTING TOLLS ALONG A TOLL ROAD

(71) Applicant: Toyota Motor Credit Corporation, Plano, TX (US)

(72) Inventor: Brittney Nicole Ferrell, McKinney, TX (US)

(73) Assignee: TOYOTA MOTOR CREDIT CORPORATION, Plano, TX (US)

( * ) Notice: Subject to any disclaimer, the term of this patent is extended or adjusted under 35 U.S.C. 154(b) by 0 days.

(21) Appl. No.: 17/354,539

(22) Filed: Jun. 22, 2021

(65) Prior Publication Data

US 2022/0406096 A1    Dec. 22, 2022

(51) Int. Cl.
*G07B 15/06*      (2011.01)
*G06Q 30/04*     (2012.01)
(Continued)

(52) U.S. Cl.
CPC ......... *G07B 15/063* (2013.01); *G06Q 20/326* (2020.05); *G06Q 30/04* (2013.01); *G06Q 30/0645* (2013.01); *G06Q 2240/00* (2013.01)

(58) Field of Classification Search
CPC .... G07B 15/063; G06Q 20/326; G06Q 30/04; G06Q 30/0645; G06Q 2240/00
(Continued)

(56) References Cited

U.S. PATENT DOCUMENTS 5,751,245 A * 5/1998 Janky ............... G08G 1/202
340/993
6,587,781 B2 * 7/2003 Feldman ........... H04W 12/02
340/909

(Continued)

FOREIGN PATENT DOCUMENTS

EP    1042738 B1    8/2005
KR    1509186 B1    4/2015
(Continued)

OTHER PUBLICATIONS

PayTollo—A Rental Car Toll Payment Solution for Florida Toll Roads page <https://www.paytollo.com/pt_rental_car_toll_payment_solution> (<http://web.archive.org/web/20180821230012/https://www.paytollo.com/pt_rental_car_toll_payment_solution> captured on Aug. 21, 2018 using Wayback Machine). (Year: 2018).*

(Continued)

*Primary Examiner* — Jeff Zimmerman
*Assistant Examiner* — Brian A Tallman
(74) *Attorney, Agent, or Firm* — DINSMORE & SHOHL LLP

(57) ABSTRACT

A system for collecting a toll owed by a rental vehicle traveling along a toll road includes network interface hardware, a memory module, and a processor communicatively coupled to the network interface hardware and the memory module. Wherein the memory module stores logic that when executed by the processor, causes the processor to receive a rental start notification from the network interface hardware;

(Continued)

and automatically execute toll payment logic stored on the memory module in response to receipt of the rental start notification. The toll payment logic causes the processor to detect and toll payment event throughout a rental period.

15 Claims, 6 Drawing Sheets

(51) Int. Cl.
*G06Q 20/32* (2012.01)
*G06Q 30/0645* (2023.01)

(58) Field of Classification Search
USPC .......................................................... 705/13
See application file for complete search history.

(56) References Cited

U.S. PATENT DOCUMENTS

| | | | |
|---|---|---|---|
| 8,587,454 | B1 | 11/2013 | Dearworth |
| 9,460,429 | B2 | 10/2016 | Du |
| 9,691,061 | B2* | 6/2017 | Deitiker .............. G07B 15/063 |
| 10,883,845 | B2 | 1/2021 | Poschinger et al. |
| 2007/0285280 | A1* | 12/2007 | Robinson ............ G07B 15/063 340/928 |
| 2012/0323772 | A1* | 12/2012 | Michael ................ G06Q 40/00 705/39 |
| 2013/0006724 | A1 | 1/2013 | Simanek et al. |
| 2013/0090991 | A1* | 4/2013 | Underwood ......... G07B 15/063 705/13 |
| 2014/0188579 | A1* | 7/2014 | Regan, III ............. G07B 15/06 705/13 |
| 2014/0244365 | A1* | 8/2014 | Price ..................... G07B 15/02 705/13 |
| 2015/0070501 | A1* | 3/2015 | Ooi ........................ G08G 1/167 348/148 |
| 2016/0171787 | A1 | 6/2016 | Yohalashet |
| 2017/0255918 | A1* | 9/2017 | Deitiker ............... G07B 15/063 |
| 2018/0025551 | A1* | 1/2018 | Centner ............ G06K 7/10297 705/13 |
| 2018/0154898 | A1* | 6/2018 | Wrobel ................. B60W 10/04 |
| 2019/0025856 | A1* | 1/2019 | Turato .................... H04W 4/46 |
| 2020/0027344 | A1* | 1/2020 | Gerges ................... G07B 15/06 |
| 2022/0020229 | A1* | 1/2022 | Higgins ............... G06Q 20/326 |

FOREIGN PATENT DOCUMENTS

| | | |
|---|---|---|
| KR | 2016006470 A | 1/2016 |
| KR | 1888661 B1 | 8/2018 |
| WO | 2016148349 A1 | 9/2016 |
| WO | 2017063052 A1 | 4/2017 |

OTHER PUBLICATIONS

PayTollo—Features page <https://www.paytollo.com/pt_features> (<http://web.archive.org/web/20200523001917/https://www.paytollo.com/pt_features> captured on May 23, 2020 using Wayback Machine). (Year: 2020).*

PayTollo—Terms and Conditions page <https://www.paytollo.com/pt_terms_and_conditions> (<http://web.archive.org/web/20200522221200/https://www.paytollo.com/pt_terms_and_conditions> captured on May 22, 2020 using Wayback Machine). (Year: 2020).*

Dias et al., "The Charge Collector System: A New NFC and Smartphone-based Toll Collection System", Conference on Electronics, Telecommunications and Computers—CETC 2013, Procedia Technology 17 (2014), p. 130-137, (Year: 2014).*

Paytollo (https://www.paytollo.com/), Apr. 12, 2021.

* cited by examiner

SYSTEMS AND METHODS FOR COLLECTING TOLLS ALONG A TOLL ROAD

TECHNICAL FIELD

The present specification generally relates to systems and methods for collecting tolls owed from traveling along a toll road and, more specifically, systems and methods for collecting tolls owed by a rental vehicle traveling along a toll road.

BACKGROUND

Rental vehicles or other vehicle services (e.g., taxis, ride shares, etc.) may often be rented or otherwise procured by users during vacations, trips, or the like. These vehicles may be driven along toll roads, which results in a tow or fee being owed by or charged to the vehicle. Tolls may be collected or charged through a variety of means such as via a manual payment window, a toll tag mounted to the vehicle, or a ticket sent to the owner registered to the vehicle, which may be identified via a license plate registry. Each of these payment modalities may be inconvenient or otherwise unavailable when traveling in a rental vehicle. For example, manual payment windows may slow travel time, thereby being inconvenient. A toll tag may be a physical tag located on or within the vehicle that the toll booth (e.g., via transponders) recognizes to charge a toll to a user's account. However, physical toll tags may be damaged, destroyed, or stolen during the course of the toll tag's life. Moreover, physical toll tags may not be portable between vehicles such that the toll tag may be used in a rental vehicle. Where a toll is billed to the owner registered to the license plate instead of the renter of the vehicle, the charge may need to be transferred or otherwise billed to the renter. Transferring charges and/or charging renters for the toll may be tedious and time consuming.

Accordingly, a need exists for alternative systems and methods for collecting tolls owed by a rental vehicle traveling along a toll road.

SUMMARY

In one embodiment, a system for collecting a toll owed by a rental vehicle traveling along a toll road includes network interface hardware. a memory module, and a processor communicatively coupled to the network interface hardware and the memory module. Wherein the memory module stores logic that when executed by the processor, causes the processor to receive a rental start notification from the network interface hardware; and automatically execute toll payment logic stored on the memory module in response to receipt of the rental start notification. The toll payment logic causes the processor to detect a toll payment event throughout a rental period.

In another embodiment, a system for collecting a toll owed by a rental vehicle traveling along a toll road includes a vehicle rental service, and a mobile device communicating with the vehicle rental service via network interface hardware. The mobile device comprises a rental application and is configured to receive a rental request to rent the rental vehicle via the rental application, determine a rental period start time for the rental vehicle based on the rental request, and automatically execute toll payment logic associated with the rental application at the rental period start time to detect a toll payment event throughout a rental period.

In yet another embodiment, a computer implemented method for paying a toll owed by a rental vehicle traveling along a toll road includes receiving via network interface hardware a rental start notification with a processor, and automatically executing toll payment logic with a processor. The toll payment logic includes detecting a toll payment event, and paying the toll associated with the toll payment event in response to detecting the toll payment event during a rental period.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are generally directed to systems and methods for collecting tolls owed by a rental vehicle traveling along a toll road. For example, in at least one embodiment, a system for collecting tolls may include network interface hardware, a memory module, and a processor. The memory module stores logic that when executed by the processor, causes the processor to receive a rental start notification from the network interface hardware, and automatically execute toll payment logic stored on the memory module in response to receipt of the rental start notification, wherein the toll payment logic causes the processor to detect a toll payment event throughout a rental period. In this way, the system can monitor a rental vehicle for situations in which the rental vehicle passes a toll booth or a toll is otherwise due to a toll authority thereby requiring payment of a toll. The system can determine the appropriate party to pay the toll given the current rental status, thereby ensuring the appropriate party is charged the fee associated with passing the toll booth. Accordingly, accounting efforts in transferring fees and ensuring appropriate parties are charged a fee associated with a toll booth are simplified.

Various embodiments of the systems and methods for collecting tolls for a rental vehicle are described in greater detail herein.

As used herein the term "rental vehicle" may refer to any vehicle (e.g., automobile, motorcycle, motorbike, or any other terrestrial, aquatic, or airborne vehicle) which is used for or by a person other than the owner of the motor vehicle for a period of time also referred to as a "rental period." Accordingly, rental vehicles may encompass vehicles rented and driven by the renter or someone associated with the renter, rideshare vehicles, taxi services, etc. A rental period may be any period of time in which the vehicle is used in the service of the renter for example, the rental period may be the length of a trip, hours, days, months, etc. depending on the rental type and agreement.

As used herein, the term "toll road" may refer to any roadway, bridge, causeway, tunnel, path, waterway, airway, or the like for which a toll (fee) is charged to allow a vehicle to travel there along.

Figure 1:
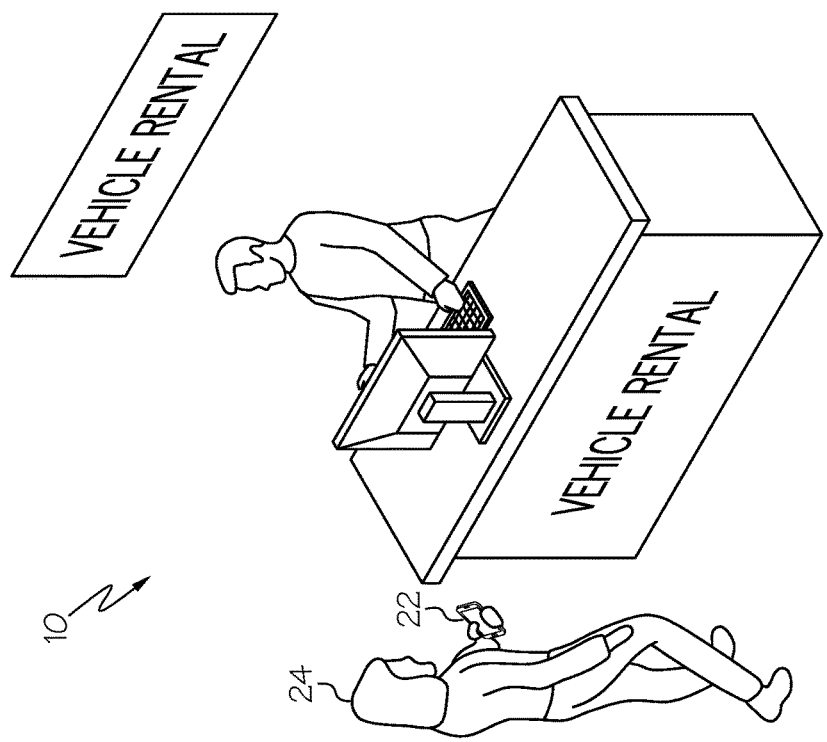
FIG. 1 schematically depicts a vehicle rental service, according to one or more embodiments shown and described herein.
Figure 1:
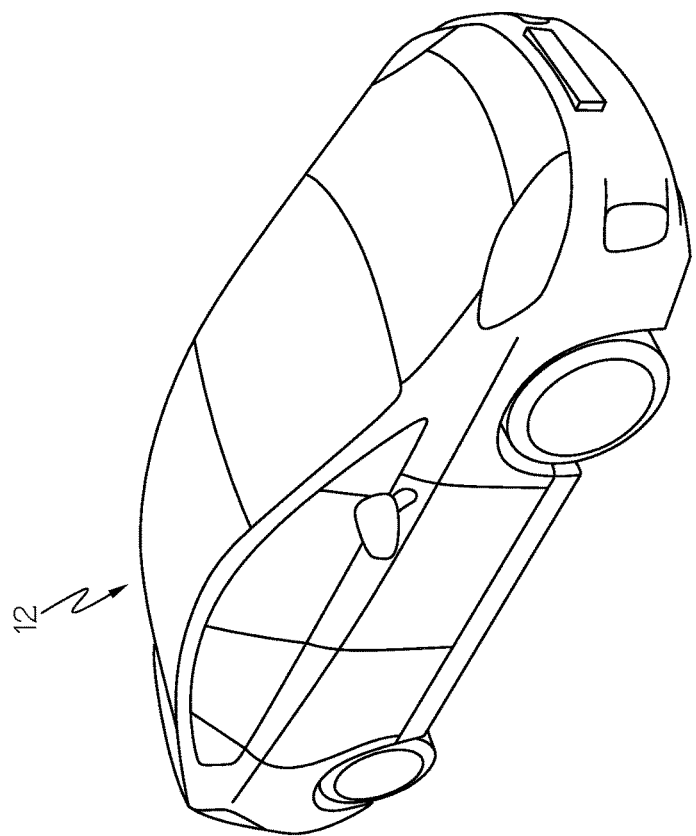

Referring now to FIG. 1, an example vehicle rental service 10 or business is generally depicted to aid in discussion of the present disclosure. However, it is noted that a vehicle rental services may take on various forms. For example, interactions between the vehicle rental service 10 and a renter 24 may be completely and/or partially virtual. For example, a renter using a mobile device 22 (e.g., a smartphone, tablet, mobile computing device, etc.) through an application or webpage associated with the vehicle rental service 10 may enter into a rental agreement to rent a vehicle for a rental period. In embodiments, a renter 24 may approach a vehicle rental service 10 e.g., either virtually and/or physically to rent a rental vehicle 12. As will be explained in detail below, when renting a vehicle a rental start time may be set. The rental start time may be at the time of the rental agreement or at some point in the future, such as when the renter 24 receives the rental vehicle 12 or the rental vehicle 12 is otherwise available for use by the renter 24. A rental start notification may be communicated to the mobile device 22 of the renter 24 via either an application on the mobile device 22 or a communication from the vehicle rental service 10 (e.g., through a server or computer associated with the vehicle rental service 10) to start toll payment logic. These and additional details will be described in greater detail herein.

Figure 2:
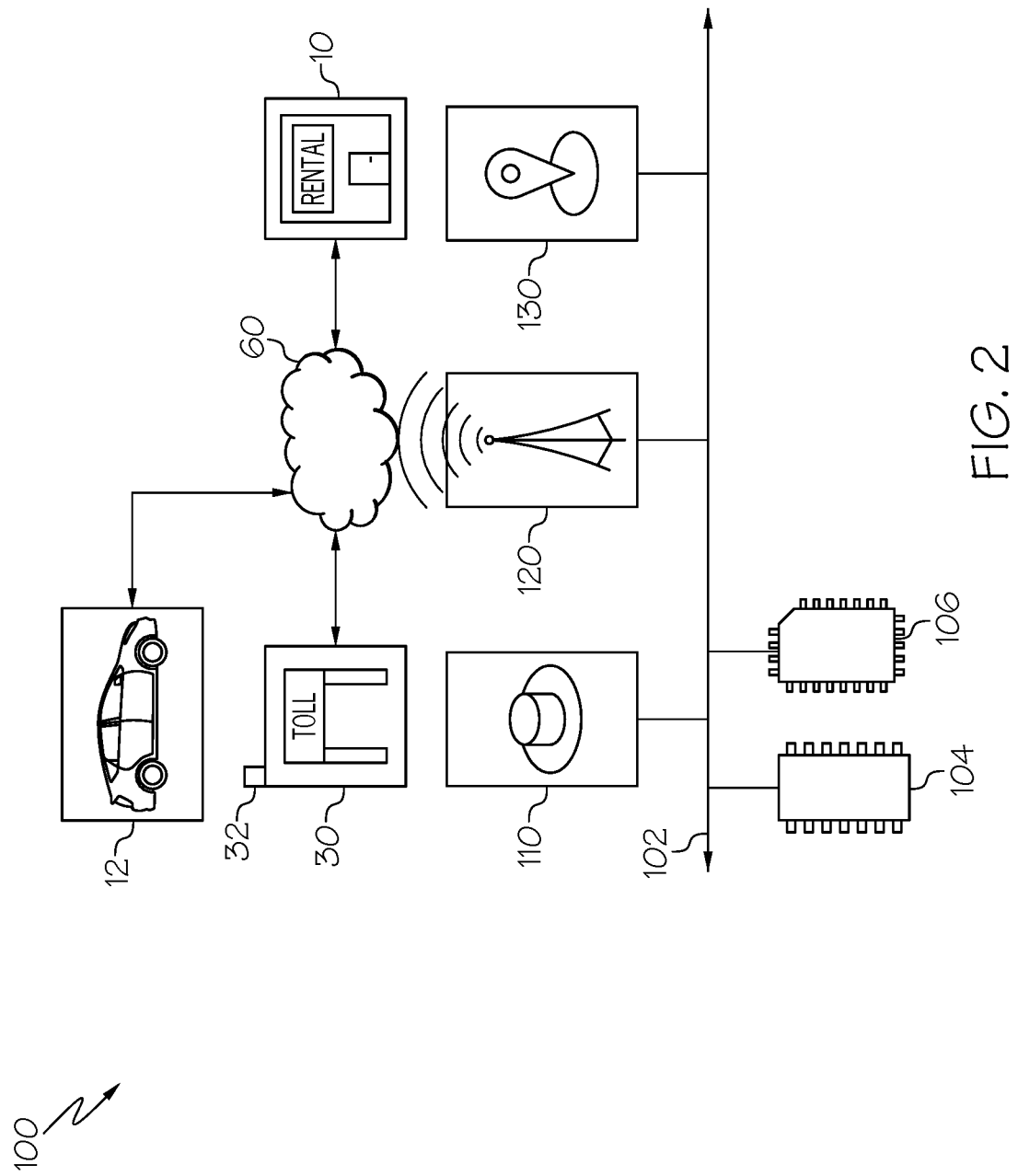
FIG. 2 schematically depicts a system for collecting tolls associated with a rental vehicle, according to one or more embodiments shown and described herein.

FIG. 2 schematically illustrates a system 100 for collecting tolls charged to or otherwise owed by the rental vehicle 12. The system 100 may generally include a communication path 102, a processor 104, a memory module 106, and network interface hardware 120 for communication through a network 60. The system 100 may further include a user interface device 110 and/or a global position system (GPS module 130). It is noted that while various modules of the system 100 are depicted, a greater or fewer number of modules may be included without departing from the scope of the present disclosure. For example, one or more portions of the system 100 may be incorporated into the mobile device 22 (generally depicted in FIG. 1), such as a smart phone, such that the mobile device 22 may operate as a virtual toll tag which may be moved between vehicles by a user. In some embodiments, various portions of the system 100 may be incorporated into the rental vehicle 12 and/or various remote servers/computing devices. In various embodiments, the modules may be distributed across devices, which communicate with one another via the network interface hardware 120. For example, various tasks performed by the system 100 may be performed via a distributed computing environment between various servers, computing devices, etc.

To aid in communication of the various modules of the system 100, the communication path 102 provides data interconnectivity between the various modules. Specifically, each of the modules can operate as a node that may send and/or receive data. In some embodiments, the communication path 102 includes a conductive material that permits the transmission of electrical data signals to processors, memories, user interface devices, etc. throughout the system 100. In another embodiment, the communication path 102 can be a bus. In further embodiments, the communication path 102 may be wireless and/or an optical waveguide. Modules that are communicatively coupled may include modules capable of exchanging data signals with one another such as, for example, electrical signals via conductive medium, electromagnetic signals via air, optical signals via optical waveguides, and the like.

Accordingly, the communication path 102 may be formed from any medium that is capable of transmitting a signal such as, for example, conductive wires, conductive traces, optical waveguides, or the like. Moreover, the communication path 102 may be formed from a combination of mediums capable of transmitting signals. In some embodiments, the communication path 102 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The processor 104 may control various operations of the system 100 and may be communicatively coupled to other modules of the system 100 via the communication path 102. The processor 104 may include any device capable of executing machine-readable instructions stored on a non-transitory computer-readable medium. Accordingly, the processor 104 may include a controller, an integrated circuit, a microchip, a computer, and/or any other computing device.

The memory module 106 is communicatively coupled to the processor 104 over the communication path 102. The memory module 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the system 100 and/or external to the system 100. The memory module 106 may be configured to store one or more pieces of logic, such as toll payment logic, as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor 104, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. In particular, and as will be described in greater detail herein, the logic stored in the memory module 106 may include toll payment logic which may be used to monitor the system 100 and/or the rental vehicle 12 to detect a toll payment event. In response to the toll payment event the system 100 may pay the toll associated with the toll payment event. In some embodiments, the memory modules may store payment information associated with the renter 24 to allow the processor 104 to process payment to pay the toll. These and other features which may be included in the toll payment logic will be discussed in greater detail below.

Still referring to FIG. 2, the GPS module 130 may be communicatively coupled to the processor 104 via the communication path 102. The GPS module 130 may provide location coordinates to the system 100. In embodiments, the GPS module 130 may include a satellite antenna configured to receive location signals from GPS satellites. For example, the satellite antenna may include one or more conductive elements that interact with electromagnetics signals transmitted by GPS satellites. The received location signal may be transformed into a data signal indicative of the location (e.g., latitude and longitude) of the system 100 by the processor 104. The processor 104 may then correlate the data signal to map information stored on the memory module 106 or otherwise available to the processor 104 to determine the location of the system 100. For example, the system 100, using the GPS module 130 may detect a toll payment event by determining the system 100, and therefore the rental vehicle 12, is entering and/or traveling along a toll road. The system 100 may further use the GPS module 130 to identify locations of one or more toll booths 30 at locations along the toll road and determine whether there is a toll payment event in response to passing the toll booths 30. For example, for some toll roads a toll is due upon entering to toll road, in other cases, a toll is due upon exiting the toll road and/or at locations between entering and exiting the toll road. In either case, GPS data may be used to determine entries and exits onto a toll road. In some embodiments, and as will be describe in greater detail below, the GPS module 130 may be the GPS module 130 of the vehicle with which the processor 104 may communicate and/or the GPS module 130 may be provided by a personal computing device, such as a smart phone.

Figure 5:
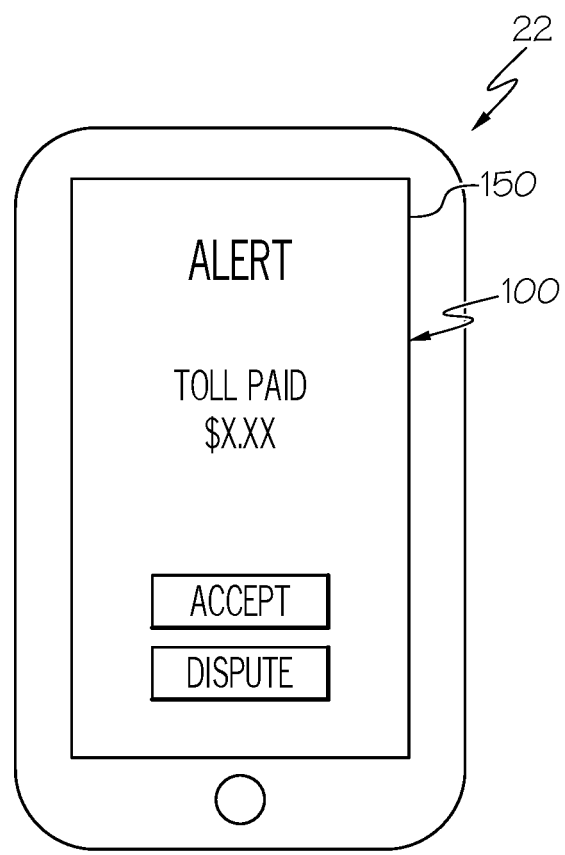
FIG. 5 schematically depicts an alert with respect to payment of a toll, according to one or more embodiments shown and described herein.

Still referring to FIG. 2, the system 100 may include a user interface device 110. For example the user interface device 110 may include any device capable of allowing a user to interact with the system 100. For example, the user interface device 110 may include a display and/or one or more user interface controls. The display may be, for example and without limitation, any liquid crystal display (LCD), light emitting diode (LED) display, electronic ink (e-ink) display, or the like that can display information to the renter 24. In some embodiments, the display may be configured as an interactive display that can receive user inputs (e.g., a touch screen display or the like). The user interface controls may include hardware components that receive inputs from a user and transmit signals corresponding to the inputs, such as a keyboard, a mouse, a joystick, a touch screen, a remote control, a pointing device, a video input device, an audio input device, and/or the like. In some embodiments, the system 100 may be incorporated into a mobile device 22 such that the display and the user interface controls are combined into a single device, for example a smart phone or other type mobile device such as illustrated in FIG. 5. The user interface controls may allow a user to interact with the system, for example to dispute a toll payment, accept a toll payment, turn on and/or off toll payment logic, or the like.

Still referring to FIG. 2, the system 100 may further include network interface hardware 120 for communicatively coupling various modules of the system 100 with a network 60. The network interface hardware 120 can be communicatively coupled to the communication path 102 and can be any device capable of transmitting and/or receiving data via the network 60. Accordingly, the network interface hardware 120 can include a communication transceiver for sending and/or receiving any wired or wireless communication. For example, the network interface hardware 120 may include an transponder, an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 120 may include hardware configured to operate in accordance with the Bluetooth wireless communication protocol. The network interface hardware 120 may include a Bluetooth send/receive module for sending and receiving Bluetooth communications to/from the one or more devices (e.g., such as to the rental vehicle 12).

In some embodiments, the network 60 may include one or more computer networks (e.g., a personal area network, a local area network, or a wide area network), cellular networks, satellite networks and/or a global positioning system and combinations thereof. Accordingly, the system 100 can be communicatively coupled to the network 60 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The processor 104 may communicate, through the network interface hardware 120, with the network 60 to communicatively couple the processor 104 and/or other modules of the system 100 with the rental vehicle 12, the vehicle rental service 10, and/or a toll booth 30, for example.

As noted above, one or more modules of the system 100 may be incorporated into the rental vehicle 12. For example, the rental vehicle 12 may communicate with the system 100 to provide a rental start notification, a rental end notification, or the like. That is, the rental vehicle may include processors, memories, network interface hardware, and/or chipsets allowing the vehicle to output rental stop and/or rental end notifications based on information available or otherwise accessible by the rental vehicle 12. For example, the vehicle may identify the renter 24 (FIG. 1) using information associated with the renter to determine that a rental period has started and/or ended and to output a communication to the processor with respect to the rental period starting or ending. In some embodiments, the system 100 may communicate with the rental vehicle 12 to access rental vehicle GPS or other vehicle sensor data or systems to determine a toll payment event, or the like. For example, using map data associated with vehicle GPS location, the system 100 may detect a toll payment event by determining that the vehicle is passing through the toll booth 30. In some embodiments, the system 100 may use vehicle sensors such as vehicle cameras and object recognition to identify a toll booth 30 from the image data of the vehicle cameras to identify a toll payment event.

In embodiments, the system 100 may communicate with the toll booth 30 or a toll booth server 32 associated with the toll booth 30, such that the system 100 communicates with a toll authority. The toll booth 30 and/or the toll booth server 32 may have processors, memory modules, network interface hardware, chipsets, and the like to calculate and/or determine tolls due by the rental vehicle 12. For example, tolls may be determined based on when a vehicle enters a toll road, leaves a toll road, and/or characteristics of the vehicle (e.g., number of axles, weight, etc.). The some embodiments, toll payment information may be saved in the memory module 106, such as toll amounts needed to pay a toll at particular toll booth locations. The toll booth 30 or toll booth server 32 may receive information from sensors (e.g., cameras, IR sensors, etc.), from the vehicle, and/or from the system 100 to determine characteristics of the vehicle (e.g., toll road entrance, exit, and/or other characteristics) to calculate a toll due. For example, the system 100 may communicate with the toll booth server 32 using a unique identifier to allow the toll booth server 32 to track and identify the system 100 along the toll road to determine a toll due. In other embodiments, the toll booth 30 and/or the toll booth server 32 may track the rental vehicle 12 and the system 100 may separately communicate with the toll booth server 32 to determine a toll due. However, other toll determination processes are contemplated and possible.

Where a toll is due, the toll booth 30 and/or the toll booth server 32 may charge the system 100 for the toll associated with the toll booth 30, such that the renter 24 is charged the amount for all or a portion of the toll due. For example, payment information may be stored by the memory module 106 associated with the renter 24. For example, in some embodiments, a renter 24 may input payment information (e.g., credit card, debit card, banking information, or the like) into the application associated with the vehicle rental service 10, such as when renting the rental vehicle 12. During payment, the payment information may be accessed by the processor to charge the toll to the renter 24. In some embodiments, only a portion of the toll may be charged to the renter 24. For example, in some embodiments, the cost of the toll may be shared between one or more parties. For example, the toll may be shared between the owner of the vehicle (e.g., the rental service 10), the renter 24 and/or a driver of the rental vehicle 12. In such embodiments, only a portion of the toll may be charged to the renter 24. For example, logic stored on the memory module 106 of the system 100 may include toll payment instructions to reduce an amount or portion of the toll paid based on a rental agreement. The toll booth 30 and/or the system 100 may charge the remaining portion of the toll to the owner and/or driver of the rental vehicle 12. For example, the memory module 106 may store payment information associated with the owner and/or the driver of the rental vehicle 12 and split or divide the cost of the toll between renter 24, the owner, and/or the driver of the rental vehicle 12.

The system 100 may communicate with the vehicle rental service 10 (such as a computer or server associated with the vehicle rental service 10) via the network interface hardware 120. For example, the system 100 may communicate with the vehicle rental service 10 to receive a rental start notification, a rental end notification, or the like. In some embodiments, the vehicle rental service 10 may communicate a rental start notification to the system 100 in response to completion of a rental agreement, an agreed upon rental start time, a renter 24 receiving or otherwise having access to the vehicle, or the like. The rental end notification may be issued by the vehicle rental service 10 in response to receiving back control of the rental vehicle 12, such as when the rental vehicle 12 is returned to a rental service location, when a trip ends, or the like. Other sources for rental start notifications and rental end notifications are contemplated and possible. For example, communication between the system 100 and the rental vehicle 12 may provide a rental start notification and/or a rental end notification. In some embodiments, an application associated with the vehicle rental service 10 may generate the rental start notification and/or the rental end notification.

As noted above, toll payment logic may allow the system 100 to monitor and detect a toll payment event. In embodiments, toll payment logic is executed by the processor 104 in response to a rental start notification received by the processor 104. For example, the rental start notification may be produced via the vehicle rental service 10, such as via a computer or a remote server associated with the vehicle rental service 10 upon the start of a rental period, or the notification may be sent indicating a start time of the rental period at some future time. As noted above, other sources of the rental start notification are contemplated and possible. The processor 104 may receive this rental start notification and automatically execute toll payment logic to monitor the rental vehicle 12 and/or the system 100 to detect a toll payment event upon the start time of the rental period and throughout the rental period.

Figure 3A:
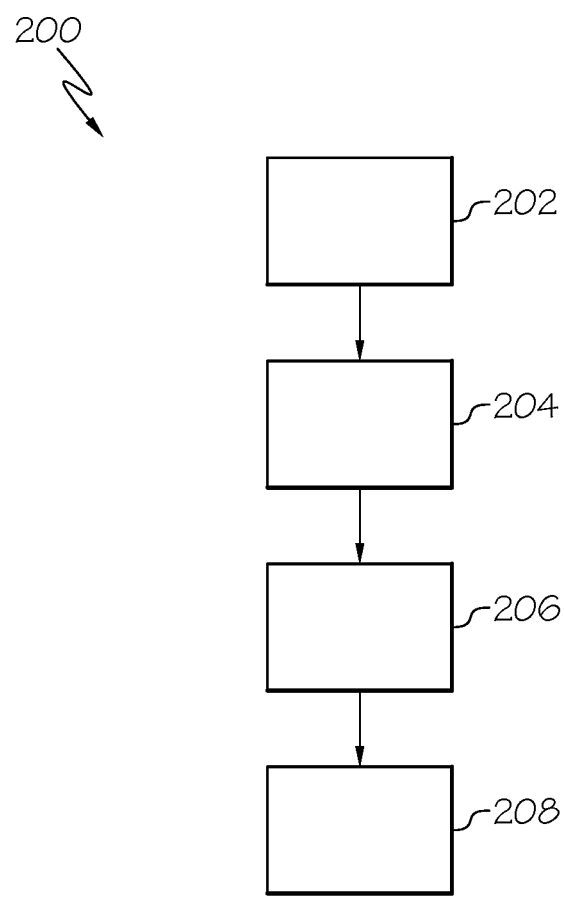
FIG. 3A schematically depicts a flow chart depicting a method for paying a toll associated with a rental vehicle, according to one or more embodiments shown and described herein.

Referring now to FIG. 3A, a flow chart depicting a method 200 is schematically depicted. It is noted that though a number of steps are generally depicted a fewer or greater number of steps, taken in any order, are contemplated without departing from the scope of the present disclosure. It is noted that various portions of the method 200 disclosed herein may be performed by a processor of a mobile device 22 such as through an application associated with the rental service 10 on the mobile device. In some embodiments, various portions of the method 200 may be performed by different computing devices, such as in a distributed computing environment.

At block 202, the method 200 includes receiving, with the processor 104, a rental start notification over the network interface hardware 120. For example, a rental request may be received from the vehicle rental service 10 (e.g., via a rental application associated with the vehicle rental service 10 or some other communication), the rental vehicle 12, or the like over the network interface hardware 120. The rental start notification may be automatically generated and/or transmitted by the vehicle rental service 10 based on receipt of the rental request. For example, it is contemplated as part of the method, a renter may input a request to rent a vehicle via a rental application associated the vehicle rental service 10 on the mobile device 22. In response, the vehicle rental service 10 and/or the rental application may output the rental start notification. In some embodiments, the processor 104 may determine the rental period start time based on the rental request, thereby providing the rental start notification.

In response to the rental start notification at block 204, the processor 104 may be caused to automatically execute toll payment logic stored on the memory module 106 at the rental period start time. At block 206, the method 200 may include receiving, with the processor 104, a rental end notification over the network interface hardware 120, as described above. In some embodiments the rental end notification may be automatically generated via the vehicle rental service 10 at the end of a rental period, in response to one or more return indicia, or the like. For example, return indicia may include a rental vehicle 12 being returned to the vehicle rental service 10, control of the rental vehicle 12 being provided back to the vehicle rental service 10, etc. The vehicle rental service 10 may automatically transmit a rental end notification based on receipt of the return indicia. In embodiments, in response to receipt of the rental end notification, the processor 104 may automatically end the toll payment logic at block 208. In some embodiments, it is contemplated that the rental end time may be determined by the processor 104. For example, the processor 104 may determine, based on the rental agreement, when the rental period ends. For example, the processor may determine a rental ends upon completion of a trip, upon a particular date and/or time, or the like. In response to receiving the rental end notification and/or otherwise determining that the rental period has come to an end, the processor 104 may automatically end toll payment logic.

Figure 3B:
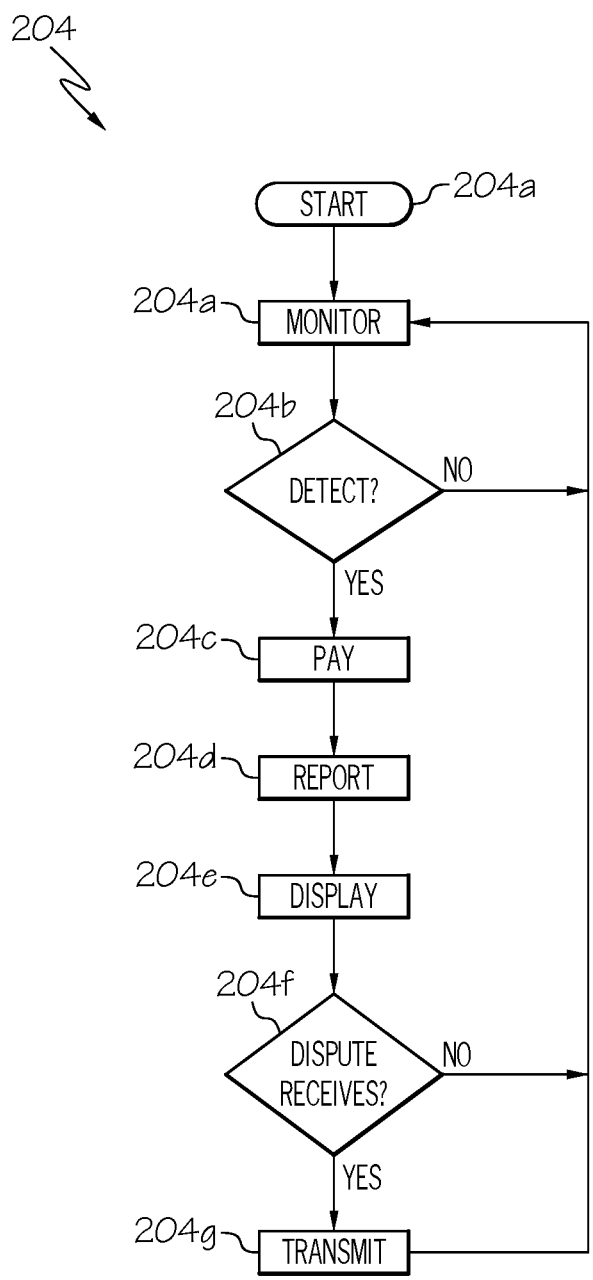
FIG. 3B schematically depicts a flowchart depicting execution of toll payment logic for paying a toll associated with a rental vehicle, according to one or more embodiments shown and described herein.

FIG. 3B illustrates an example toll payment logic diagram of block 204 of FIG. 3A. It is noted that the logic diagram may include a greater or fewer number of steps, in any order, without departing from the scope of the present disclosure. In embodiments, the flow chart may start at block 204a. As noted above, toll payment logic may start in response to the processor 104 receiving a rental start notification. At block 204b, the toll payment logic causes the processor 104 to monitor the system 100 and/or the rental vehicle 12 to detect a toll payment event throughout the rental period. As noted above, a toll payment event may be detected in a number of ways. For example, a toll payment event may be determined via communication with a toll booth 30 and/or a toll booth server 32 associated with the toll booth 30. In some embodiments, the toll payment event may be detected via GPS data from the GPS module 130 or a GPS unit associated with the rental vehicle 12 to identify a location of a toll booth 30 to identify a toll payment event. In some embodiments, route prediction based on renter history, if available, may be used to predict a route a calculate tolls due along the predicted route. In some embodiments, the driver, the renter, and/or the rental service may enter travel details, such as into a rental vehicle GPS unit, such that the route is determined. The processor 104, based on the route, may determine toll payment events along the route. Other methods of toll payment event detection are contemplated and possible. Where no toll payment event is detected, the processor 104 may continue to monitor the system 100 and/or the rental vehicle 12 for a toll payment event.

Figure 4:
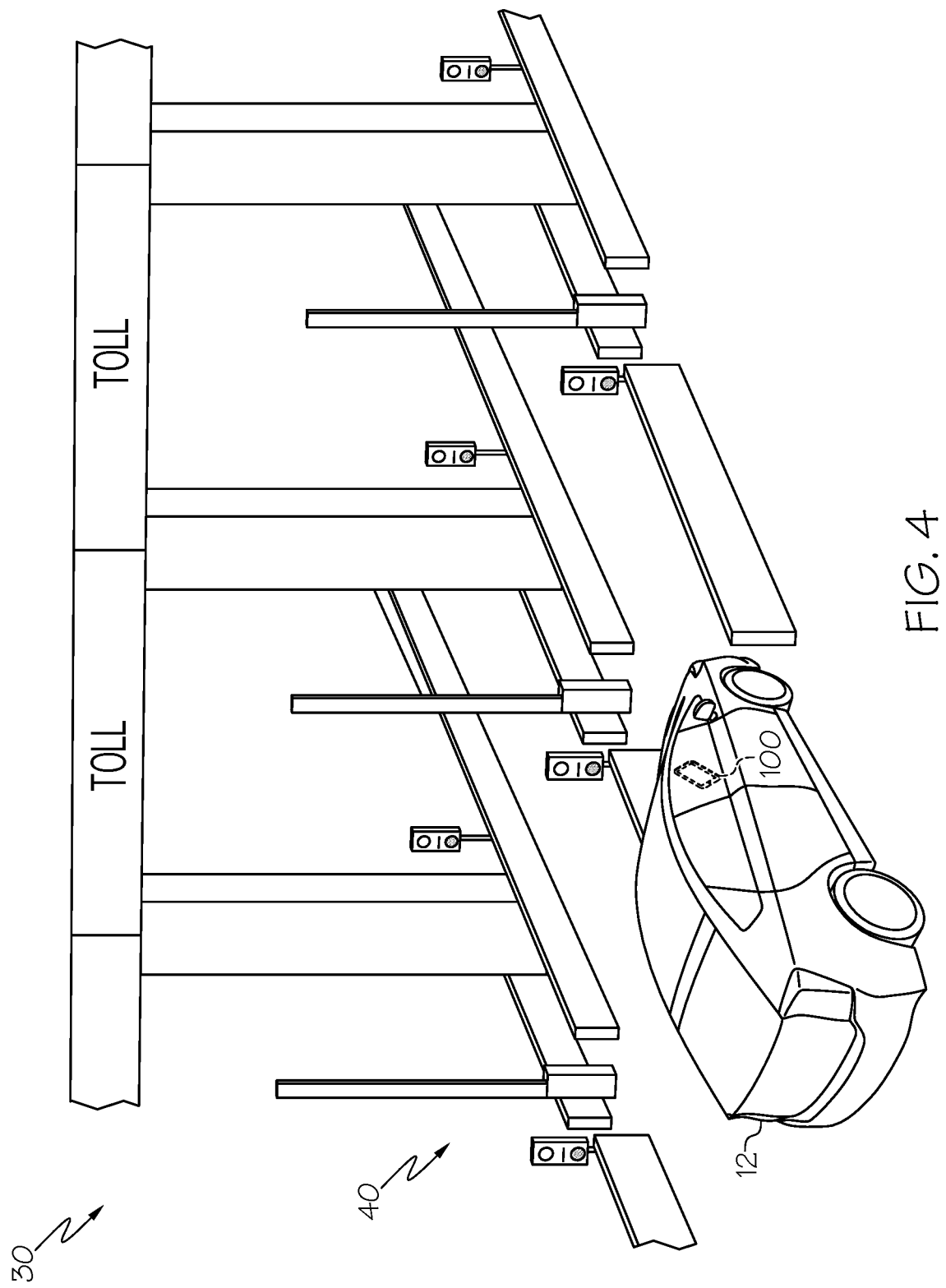
FIG. 4 schematically depicts a rental vehicle passing through a toll payment event, according to one or more embodiments shown and described herein.

Referring now to FIG. 4, the rental vehicle 12 approaching a toll booth 30 is schematically depicted. As noted above, the system 100 may monitor the system 100 and/or rental vehicle 12 to detect a toll payment event. A toll payment event may include a vehicle traveling through a toll booth 30 located along a toll road 40. For example, and as noted above, the processor 104 may communicate with the toll booth 30 such as a toll booth server 32 (schematically depicted in FIG. 2) associated with the toll booth 30 to determine if and to what amount a toll is due. In yet further embodiments, the system 100 may use the GPS module 130 and/or a GPS associated with the rental vehicle 12 to determine the vehicle is passing a toll booth 30 in response to passing a toll location identified via location information. Other methods for identifying a toll payment event are contemplated and possible.

Referring again to FIG. 3B, in response to the toll payment event, such as depicted in FIG. 4 (e.g., passing the toll booth 30), the processor 104, while executing toll payment logic may be caused at block 204c to automatically pay the toll associated with the toll booth 30 using payment information associated with the renter 24 and/or splitting the cost of the toll between the renter 24, the owner, the driver, or the like. For example, and as noted above, when renting the vehicle, the user may provide the vehicle rental service 10 payment information to which tolls associated with a toll payment event may be charged.

In some embodiments, the toll payment logic may further include, at block 204d, generating a payment report for a balance paid, which may be transmitted, with the network interface hardware 120 to the toll booth 30 and/or the toll booth server 32. In such embodiments, the toll authority associated with the toll booth server 32 and/or the toll booth 30 may confirm that payment for the rental vehicle 12 was received such that any charge inadvertently charged to the owner of the rental vehicle 12 and/or the driver may be refunded or canceled. For example, the toll booth 30 and/or the toll booth server 32 may account for the payment received from the system 100 to ensure full payment and that no other parties are charged for the toll. The payment report may include information for identifying the rental vehicle 12, the owner of the rental vehicle 12, the toll due, the amount paid, the parties to the payment, and/or the like, to allow the toll authority to ensure payment has been received and/or to issue any refund/cancel any inadvertent charges. In some embodiments, the payment report may also be communicated over the network interface hardware 120 to the vehicle rental service 10.

In some embodiments, at block 204e, the payment report may be displayed to the renter 24, via the user interface device 110, as an alert. That is, the processor 104 can cause the user interface device 110 to generate an alert to user, which may include the payment report. For example, the alert may appear via an application on a mobile device 22 (e.g., a smartphone), via text message, or the like. Referring to FIG. 5, an example mobile device 22 is schematically depicted which encompasses one or more portions of the system 100. In embodiments, the user interface device 110 may include a display 150 such as a touch screen display, though other user interface devices are contemplated and possible. In some embodiments, the payment report may be displayed before and/or after payment of the toll to allow the renter 24 to accept or dispute the charge at block 204f. Referring again to FIG. 3B, if the toll is accepted and/or if no dispute is input via the user interface device 110, the toll payment logic may return to monitoring the system 100 and/or the rental vehicle 12 for a toll payment event. However, where a dispute is received, the processor 104 may transmit the dispute input at block 204g to the vehicle rental service 10 associated with the rental vehicle 12. In response to receiving the dispute, the vehicle rental service 10 may determine if a refund of the fee to the renter 24 is warranted.

Still referring to FIG. 3B, the system 100 may continue executing toll payment logic to automatically detect and pay tolls in response to toll payment events. As noted above, toll payment logic may automatically end in response to the one or more processors receiving a rental end notification indicating that the rental period has come to any end.

It should now be understood that embodiments of the present disclosure are directed to systems and methods for collecting tolls owed by a rental vehicle traveling along a toll road. For example, in at least one embodiment, tolls may be automatically charged to a renter of a vehicle in response to detection of a toll payment event. In embodiments as described herein, to assist in toll payment, toll payment logic may be automatically executed in response to the start of a rental period, thereby allowing toll payments to be automatically processed during travel. In this way, the system can monitor a rental vehicle for situations in which the vehicle passes a toll booth or a toll is otherwise due thereby requiring payment of a toll. The system can determine the appropriate party to pay the toll given the current rental status, thereby ensuring the appropriate party is charged the fee associated with passing the toll booth. Accordingly, accounting efforts in transferring fees and ensuring appropriate parties are charged a fee associated with a toll booth are simplified. Moreover, systems according to the present disclosure may split toll fares between users where appropriate. For example, tolls may be split among different payees to automatically allow various parties subject to the toll to share costs.

It is noted that while components may be described in singular form, such component is intended to include embodiments with multiples of such component without departing from the scope of the present disclosure. Accordingly, "a," "an," "at least one," and "one or more" are interchangeable with one another unless otherwise noted.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for collecting a toll owed by a rental vehicle traveling along a toll road, the system comprising:
a network interface hardware;
two or more sensors comprising at least a GPS unit and one or more vehicle cameras mounted to the rental vehicle, the two or more sensors configured to output a signal indicative of a location of the rental vehicle relative to a toll booth;
a user interface device;
a memory module; and
a processor communicatively coupled to the network interface hardware, the two or more sensors, the user interface device, and the memory module, wherein the memory module stores a toll payment logic that when executed by the processor, causes the processor to:
receive a rental start notification from the network interface hardware; and
automatically execute the toll payment logic throughout a rental period stored on the memory module in response to receipt of a rental start notification, wherein the toll payment logic causes the processor to:
detect, using the two or more sensors, a location of the system relative to the toll booth based on the signal from the GPS unit and by performing object recognition on image data from the one or more cameras to identify the toll booth from the image data;
determine a toll payment event wherein a toll payment is due based on the location of the system relative to the toll booth;
access a stored rental agreement stored on the memory module;
split the toll payment between a renter, an owner, and a driver, based on the stored rental agreement;
generate an alert with the user interface device that the toll payment is due based on the location of the system relative to the toll booth, wherein the alert provides at least one of a notification of payment of the toll, a selection to pay the toll, and a selection to dispute the toll,
receive a rental end notification from the network interface hardware;
automatically end the toll payment logic in response to receipt of the rental end notification;
generate a payment report for a balance paid; and
transmit the payment report to a toll booth server with the network interface hardware.

2. The system of claim 1, wherein the toll payment logic causes the processor to automatically pay the toll.

3. The system of claim 2, wherein the toll is paid in response to the system passing through the toll booth.

4. The system of claim 1, wherein the toll payment logic causes the processor to:
receive a dispute input from the user interface device; and
transmit, with the network interface hardware, the dispute input to a vehicle rental service server associated with the rental vehicle.

5. A system for collecting a toll owed by a rental vehicle traveling along a toll road, the system comprising:
a vehicle rental service server;
two or more sensors comprising at least a GPS unit and one or more vehicle cameras mounted to the rental vehicle, the two or more sensors configured to output a signal indicative of a location of the rental vehicle relative to a toll booth; and
a mobile device communicating with the vehicle rental service server via a network interface hardware, wherein the mobile device comprises a rental application, wherein the mobile device is configured to:
receive a rental request to rent the rental vehicle via the rental application;
determine a rental period start time for the rental vehicle based on the rental request;
automatically execute toll payment logic associated with the rental application at the rental period start time to detect a toll payment event throughout the rental period, wherein the toll payment logic causes the mobile device to:
detect, using the two or more sensors, a location of the system relative to the toll booth based on the signal from the GPS unit and by performing object recognition on image data from the one or more cameras to identify the toll booth from the image data;
determine a toll payment event wherein a toll payment is due based on the location of the system relative to the toll booth;
access a rental agreement;
split the toll payment between a renter, an owner, and a driver, based on the rental agreement;
generate an alert with a user interface device of the mobile device that the toll payment is due based on the location of the mobile device relative to the toll booth, wherein the alert provides at least one of a notification of payment of the toll, a selection to pay the toll, and a selection to dispute the toll,
receive a rental end notification from the network interface hardware;
automatically end the toll payment logic in response to receipt of the rental end notification;
generate a payment report for a balance paid; and
transmit the payment report to a toll booth server with the network interface hardware.

6. The system of claim 5, wherein the toll payment logic causes the mobile device to automatically pay the toll in response to the toll payment event.

7. The system of claim 6, wherein the toll payment event comprises the mobile device passing through the toll booth.

8. The system of claim 6, wherein the toll payment logic further causes the mobile device to generate a payment report in response to payment of the toll.

9. The system of claim 5, wherein the toll payment logic further causes the mobile device to:
receive a dispute input from the user interface device of the mobile device; and
transmit, with the network interface hardware, the dispute input to the vehicle rental service server associated with the rental vehicle.

10. A computer implemented method for paying a toll owed by a rental vehicle traveling along a toll road, the method comprising:
receiving via a network interface hardware a rental start notification; and
automatically executing toll payment logic with a processor, the toll payment logic comprising:
detecting, using two or more sensors comprising at least a GPS unit and one or more vehicle cameras mounted to the rental vehicle, the two or more sensors configured to output a signal indicative of a location of the rental vehicle relative to a toll booth, a location of the rental vehicle relative to the toll booth based on the signal from the GPS unit and by performing object recognition on image data from the one or more cameras to identify the toll booth from the image data;
determining a toll payment event wherein a toll payment is due based on the location of the vehicle relative to the toll booth;
accessing a rental agreement;
splitting the toll payment between a renter, an owner, and a driver, based on the rental agreement;
generating an alert with a user interface device that the toll payment is due based on the location of the rental vehicle relative to the toll booth, wherein the alert provides at least one of a notification of payment of the toll, a selection to pay the toll, and a section to dispute the toll,
automatically generating via a vehicle rental service server the rental start notification based on receipt of a rental request;
transmitting the rental start notification to the processor via the network interface hardware;
generating a payment report for a balance paid; and
transmitting the payment report to a toll booth server with the network interface hardware.

11. The method of claim 10, further comprising:
receiving a rental end notification from the network interface hardware; and
automatically ending the toll payment logic in response to receipt of the rental end notification.

12. The method of claim 11, wherein the rental end notification is received in response to the rental vehicle being returned.

13. The method of claim 11, further comprising:
automatically generating via a vehicle rental service server, the rental end notification based upon return of the rental vehicle; and
transmitting the rental end notification to the processor via the network interface hardware.

14. The method of claim 10 further comprising:
receiving a dispute input with the processor via a user interface device; and
transmitting, with the network interface hardware, the dispute input to the vehicle rental service server associated with the rental vehicle.

15. The method of claim 10, further comprising:
determining with the toll booth server whether a toll-initiated charge has been charged to the rental vehicle owner or the rental vehicle in addition to the balance paid; and
canceling or refunding the toll-initiated charge, wherein the payment report comprises information for identifying the rental vehicle or the rental vehicle owner.

* * * * *